March 17, 1953  C. A. VOSSBERG, JR  2,632,117
MEASURING APPARATUS
Filed Aug. 9, 1950

INVENTOR.
Carl A. Vossberg
BY
S. Stephen Baker
ATTORNEY

Patented Mar. 17, 1953

2,632,117

UNITED STATES PATENT OFFICE 2,632,117

MEASURING APPARATUS

Carl A. Vossberg, Jr., Lynbrook, N. Y.

Application August 9, 1950, Serial No. 178,425

16 Claims. (Cl. 250—83.3)

This invention relates to measuring systems and more particularly to an apparatus employing a source of radiation such as an X-ray tube and the determination of physical characteristics of materials by directing the radiation therethrough. In general, the system may be used for determining the thickness of a specimen although its density, flaws, composition or impregnation, or the like can be measured. The measurement is effected without requiring physical contact with the specimen or material.

The measurement of thickness by employing X-rays has been known and practiced for some time. These systems generally rely on a constant source of X-ray radiation, both as to quantity and quality. In fact, precise regulation is essential, and elaborate precautions to maintain such regulations are practiced. In most instances, a different thickness of the standard, or a change of material, requires an adjustment of the X-ray tube voltage.

With the foregoing in mind, I have devised a system for measuring materials through X-ray penetration wherein precise regulation is unnecessary. Furthermore, with the instant system, the thickness range of materials which may be tested is very great since it is only necessary that it be of such a character that sufficient X-rays may penetrate therethrough. Measurements are only taken at a predetermined amplitude or the like of the X-rays which have penetrated the material.

The foregoing is achieved by providing an amplifier which responds to a predetermined level of varying X-ray output from the material under examination and which automatically cuts off the X-ray voltage when such predetermined amplitude has been reached. The amplifier will operate therefore at an X-ray tube voltage value which depends upon the thickness or other characteristic of the material being measured since it is evident that a thicker material, for example, will require a higher X-ray tube voltage before the penetrated radiation reaches the predetermined level for operating the amplifier. Inasmuch as the action of the amplifier is to cut off the X-ray tube voltage, a peak voltmeter or indicator is employed to measure the X-ray tube voltage which caused the amplifier to operate. Obviously, the indicator can be appropriately calibrated in terms of a reference specimen.

The invention will be further understood from the following description and drawings in which.

Figure 1:
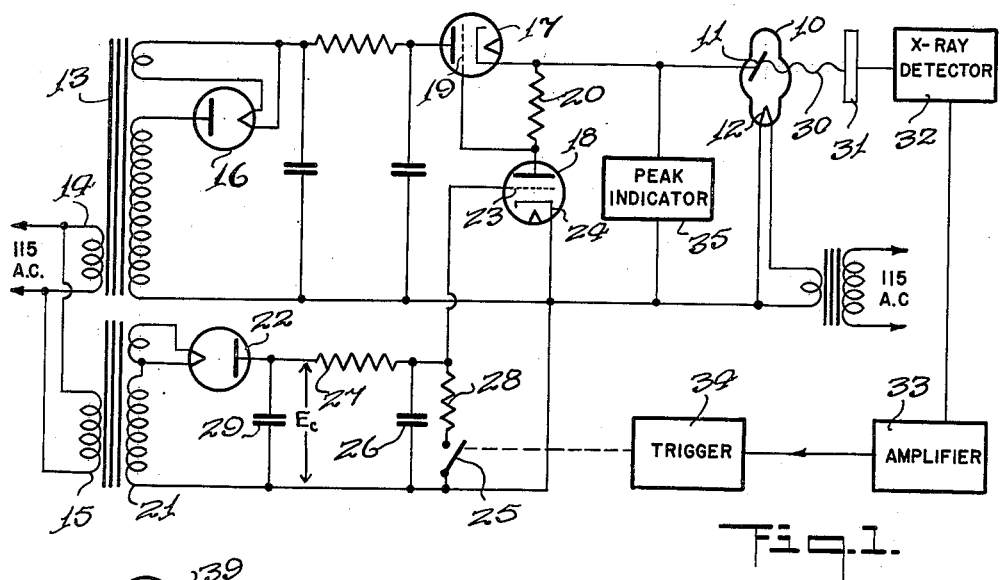
Fig. 1 is a schematic, circuit diagram of one form of the overall system.

Referring to Fig. 1, the radiation generator is disclosed as an X-ray tube 10 although it may represent any generator of the particular radiation that is required. For example, a lamp or other source of radiation can be utilized for color analysis, diffraction elements, turbidity, etc. The anode 11 and cathode 12 of the X-ray tube are connected to a high voltage produced through the secondary of power transformer 13. Primary 14 is connected to a suitable A.-C. power supply as is the parallel primary winding 15. The high voltage appears across the output of rectifier 16 as will be evident. Accordingly, it will be observed that the voltage applied to X-ray tube 10 will depend upon the conductivity of tube 17 which is illustrated as being in the high voltage path to the anode 11.

The voltage applied to the X-ray tube 10 may be thus controlled by controlling the conductivity of tube 17. This is effected by applying the output of tube 18 to the grid 19 of tube 17. Obviously, the biasing voltage on grid 19 will depend upon the voltage drop produced by plate resistor 20.

The output of secondary winding 21 is applied after rectification by tube 22, as a biasing voltage $E_c$ applied between the grid 23 and cathode 24 of tube 18. If the full voltage is applied thereto, the bias on grid 23 will bring tube 18 to a point approaching cut-off so that the bias on grid 19 is correspondingly reduced or eliminated. As a consequence, tube 17 will be fully conductive and the maximum voltage will be applied to X-ray tube 10. Taking, the other extreme, if no bias is applied to grid 23, tube 18 will be highly conductive, tube 17 will be non-conductive, and the X-ray tube voltage will be at a minimum. Actually, however, the instant system operates by applying a grid bias voltage in exponential varying form to grid 23 so that cut-off and consequent gradual release of tube 17 for correspondingly varying the X-ray tube voltage is accomplished. This is provided by switch 25 which is disposed across the grid bias voltage for tube 18. A condenser 26 is arranged in parallel with switch 25, and a resistor 27 forms a time constant network with condenser 26 for regulating the charge time thereof as will be evident. A limiting resistor 28 is employed to protect the switch contacts. Condenser 29 serves as a filter as do similar condensers in the X-ray tube voltage input.

Switch 25 may take the form of a relay or a thyratron or the like, operation thereof to be herein after described. In any event, it will be recognized that when switch 25 is closed, tube 18 will be operating at zero bias, and the consequent large current flow therethrough will produce a substantially non-conductive state for tube 17. Accordingly, X-ray tube 10 will be supplied with very low plate voltage, insufficient for the production of X-rays. On the other hand, should the switch 25 be opened, condenser 26 will charge exponentially toward the value of $E_c$ through resistor 27. It will be obvious that, if desired, the exponential voltage curve could be made very linear over the usable portion by making voltage $E_c$ relatively large.

As the voltage across condenser 26 increases, the bias on tube 18 also increases causing a lowering of plate current which decreases the bias on tube 17 and accordingly increases the X-ray anode voltage. Obviously, a point will be reached when appreciable X-rays will be emitted by tube 10. The X-rays 30 are arranged to pass through specimen 31 which is under examination. The penetrating radiation then falls on X-ray detector 32 which may assume any one of several forms such as an ionization chamber or a fluorescent screen and phototube arrangement. The phototube may, of course, be of the photomultiplier type. The output of detector 32 is coupled to an amplifier 33 which, in the instant application, serves to produce triggering signals for closing switch 25 and cutting off the X-ray tube voltage pursuant to the action above described.

The output of amplifier 33 is applied to trigger 34 which serves to close switch 25. Thus, trigger 34 may comprise a relay having contacts which are normally open, such contacts comprising switch 25. When the amplifier output is sufficiently high, the relay is energized and the switch closes. As above explained, closing of switch 25 removes the charge from the condenser 26 so as to lower the X-ray tube voltage whereupon the amplifier signal disappears. This automatically causes the trigger relay to open or re-set, and the cycle may then be repeated. It will be recognized that a continuous strip of steel or the like may be measured as to thickness as it travels in front of the X-ray tube 10. The peak indicating device 35 indicates the peak X-ray tube voltage required for operating the trigger and is therefore a measurement of the thickness of the steel strip section or specimen under examination. The sweep period, which comprises the time during which the voltage across condenser 26 increases, so as to accordingly increase the X-ray anode voltage, is dependent upon particular elements of the circuit such as the value of time constant resistor 27 and condenser 26, the bias and main supply voltages, the characteristics of the X-ray tube, the attenuating factors on the X-rays, and the gain of the detector, amplifier, and trigger devices. At any rate, such sweep period can be reasonably controlled, as will be evident, to meet the requirements of measuring successive portions of a steel strip as desired.

It will be further understood that trigger 34 may include a thyratron tube to actuate the relay and switch 25. The triggering action may be made self-quenching as by cutting off the plate voltage of the thyratron after it has effected closing of switch 25. Such cutting off of the plate voltage can be effected either by switch 25 or by another switch contact on the relay of trigger 34.

Figure 2:
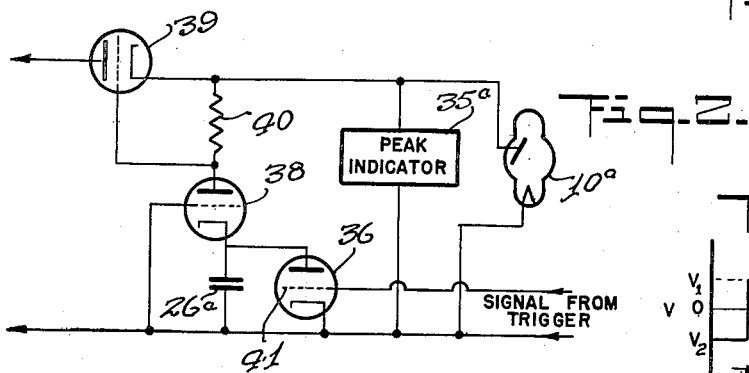
Fig. 2 is a modification of the amplifying trigger system disclosing electronic means for triggering the X-ray tube voltage.

In Fig. 2 is disclosed a form of electronic means for discharging condenser 26a which condenser is equivalent in operation to condenser 26 of the previous embodiment. Tube 36 serves to discharge the condenser 26a to produce substantially the same effect as closing of switch 25. It will be noted that condenser 26a is in self-charging circuit so that a separate winding, such as secondary 21 of the previous embodiment, is not required.

Figure 3:
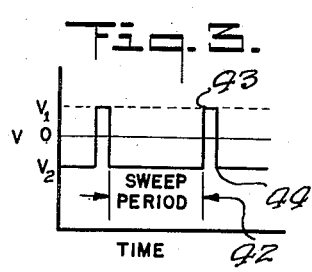
Fig. 3 is a graphical representation of the signal which triggers the X-ray tube voltage in the modification.

Assuming that tube 36 is cut off, as by means to be hereinafter described, and condenser 26a is initially in an uncharged state, tube 38 (equivalent to tube 18) is in a conductive state because of substantially zero bias thereon. Accordingly, tube 39 (equivalent to tube 17) will have considerable bias applied from the voltage drop across the resistor 40 so as to reduce the X-ray tube voltage to a minimum. As condenser 26a charges, the bias on tube 38 increases and the X-ray tube voltage increases. This increase would continue until tube 38 is cut off. Such cut-off may be effected by reducing the voltage on grid 41 of discharge tube 36 either to zero or making it positive with respect to its cathode so that condenser 26a may discharge through tube to a low value which lowers the X-ray tube voltage and completes the sweep cycle. As the bias is reapplied to grid 41 of tube 36, the cycle would repeat. It will be evident therefore that in the modification of the condenser discharging circuit shown in Fig. 2, the trigger is required to furnish substantially square waves as indicated in Fig. 3.

The production of square waves from the trigger may follow Patent No. 2,516,201 and, in any event, is well understood to those skilled in the art and need not be described. Thus, the wave indicated in Fig. 3 may be produced by conventional elements and circuits. Trigger 34 will be arranged to produce the wave illustrated in Fig. 3 when the capacitor discharging switch takes the electronic form illustrated in Fig. 2. The trigger will normally supply a voltage designated as $V_2$ which maintains tube 36 at cut-off. When the X-ray tube voltage reaches a point wherein it delivers sufficient X-rays to penetrate specimen 31 and develops a sufficient signal in the output of amplifier 33, the trigger will be fired or otherwise actuated and will then supply a voltage designated as $V_1$ to grid 41 so as to render tube 36 conductive and discharge condenser 26a. As above explained, this will stop the production of X-rays, and the trigger, if self-quenching as above described, will open and return to voltage $V_2$.

In either embodiment, as condenser 26a discharges, a point is reached where the production of X-rays drops, and the trigger input signal drops accordingly. The next sweep period, designated as 42 in Fig. 3, repeats the X-ray tube voltage increase until the trigger is operated at point 43, where it remains until the start of the next sweep at point 44.

Figure 4:
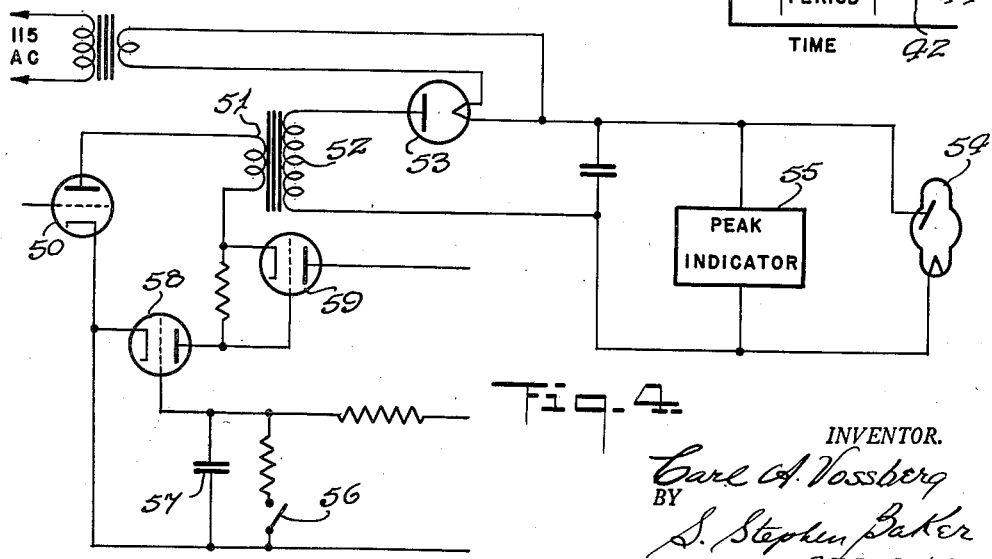
Fig. 4 is a further modification wherein the control tubes and triggering system are applied to a low voltage source rather than to the stepped-up voltage which is applied to the X-ray tube.

In Fig. 4 is illustrated a modification wherein the X-ray voltage control tubes are disposed in the primary voltage circuit rather than in the secondary thereof which was illustrated in Fig. 1. Thus, the control tubes may be required to handle considerably less voltages. The voltage source may comprise a radio frequency generator 50, the output of which is applied through primary winding 51 of a transformer to a stepped up secondary winding 52. The voltage across winding 52 is rectified by tube 53 and applied to X-ray tube 54. As in the previous embodiment, the peak indicating meter 55 will read the maximum voltage applied thereto, which was that voltage required to operate the trigger, so as to close switch 56 and discharge condenser 57. Tubes 58 and 59 are equivalent to tubes 18 and 17 of the embodiment of Fig. 1.

It will further be recognized that the sweep frequency can be externally controlled by a timer whose period is longer than the maximum time sweep required. In such a circuit, the trigger 34 may comprise a thyratron tube having a relay of which switch 25 is a contact. The external timing device may re-set the trigger by cutting off the thyratron plate voltage at the desired start of each sweep which would be cyclical as controlled by repeat periods of the timer. The thyratron plate voltage would be cut off only momentarily for extinguishing it, and it would again become conductive so as to again close the switch at the end of the next sweep. The timer may operate, for example, at one second or any other desired intervals.

It will be understood from the foregoing that the full range of X-ray tube voltage is swept in each cycle. However, it is evident that in most cases where steel strips or substantially similar specimens are being measured, it is unnecessary to sweep the full range because deviations from a normal thickness will not be extreme. Accordingly, the X-ray tube voltage may sweep from minimum to the triggering point only on the first excursion and then return only a nominal amount and sweep around the mean value just enough to include the maximum anticipated variations or deviations in the specimen. Such an expedient saves considerable time and further may increase accuracy in measuring successive portions of a strip. It can be utilized when it may be known that the characteristics of the specimen or strip would not change radically once the mean point has been determined. The foregoing action may be realized by employing an incremental sweep generator whose range of sweep voltage is limited and superimposed on the regular or wide range sweep voltage generator. The wide range sweep generator would be automatically stopped from sweeping and remain at the approximate mean value for the given specimen, while the incremental sweep generator would continue to explore the region around this setting except when the amplifier output varies outside of this limited range. At such time, the wide range generator would resume action.

The incremental sweeper may operate simultaneously with the wide sweeper because the peak voltage of the combined voltages produced by both sweepers is measured by the peak indicator. Whenever the amplifier produces an output of the predetermined value at the start of the incremental sweeper, the wide sweeper must be re-set. If the sum of the two sweepers is insufficient for producing amplifier output, the wide sweeper must be made to increase. This can be accomplished by using only the incremental sweeper and permit the average voltage to be reached by connecting the rectifier and filtered amplifier output of Fig. 1 to the grid 23 of tube 18 as hereinafter described in a further modification. This will provide all the advantages of a sweep or scanning system, including independence from line voltage variations and offering complete scanning of range, while eliminating the necessity of complete scanning in each cycle. In effect, this comprises superimposing a ripple on the mean but slowly varying voltage to accommodate slow changes in thickness and stopping the incremental sweep at the correct point. It should further be understood that the incremental sweep may be permitted to continue its complete excursion, and measurement will only be taken of the voltage which coincides with the required amplifier output as used for triggering. Obviously, the peak indicator would be modified to measure the voltage when coincidence occurs.

It will be recognized from the foregoing that the entire thickness range of the gage can be scanned or employed every cycle when necessary. This is of considerable importance since conventional gages must be set up in advance for a desired thickness or the like whereby its indicator may read any deviation from that setting. In a conventional gage, it is impractical, for example, to rapidly sort out or measure a random pile of sheets of which the gage may differ considerably. In the instant system, this requirement is essentially met under normal circumstances since the material is scanned or scanned from zero to the maximum limit of X-rays, which sweep or scan automatically includes the thickness of the specimen.

A modification of the above principle may be accomplished by automatically and continuously controlling the X-ray tube voltage to produce a constant amplifier output. Referring to Fig. 1, for example, if we connect the rectifier and filtered amplifier output to grid 23 of tube 18, we would automatically effect this result. In this case, we would be measuring the X-ray tube voltage required for the proper amplifier output which would be a measurment of the specimen's characteristic. The usual anti-hunt circuits would probably be required in the meter circuit. However, the preferred embodiments are those expressed in the means above described.

It will be further understood that the peak indicator may be eliminated if desired and a frequency meter connected to the trigger 34 or other convenient point of the circuit for measuring the repetition rate or sweep frequency of the trigger action. Obviously, the repetition rate will depend upon the thickness of the specimen because the voltage applied to the X-ray tube rises at a predetermined rate (which, in the present embodiment, is illustrated as being exponential although it may be uniform or the like). The thicker the specimen, the longer will be the time required to reach adequate penetration voltage and the lower will be the frequency. Similarly, a time interval meter may be employed to measure the time between the start of voltage rise and the instant at which it is interrupted. An additional contact on switch 25 may be conveniently used to control the time interval meter.

What is claimed is:

1. A measuring system comprising a voltage actuated radiation generator the output of which varies as a function of the voltage applied thereto, means for supporting a specimen a characteristic of which is to be measured by the penetration thereof by the output of the generator, means for applying a varying voltage to said generator, the variation being substantially in one direction, a detector responsive to radiation penetrating said specimen, means controlled by said detector for cutting off the voltage applied to said generator when the specimen penetrating radiation reaches a predetermined value, and a meter, the indication of which is a function of the voltage applied to the generator at the point of cut-off.

2. A measuring system comprising a voltage actuated radiation generator the output of which varies as a function of the voltage applied thereto, means for supporting a specimen a characteristic of which is to be measured by the penetration thereof by the output of the generator, a meter for measuring the peak actuating voltage applied to said generator, means for applying a gradually increasing voltage to said generator, a detector responsive to radiation penetrating said specimen, and a trigger device controlled by said detector for interrupting the increase of voltage as applied to said generator when the specimen penetrating radiation reaches a predetermined value.

3. A measuring system comprising a voltage actuated radiation generator the output of which is dependent upon the voltage applied thereto, means for supporting a specimen a characteristic of which is to be measured by the penetration thereof by the output of the generator, a meter for measuring the peak actuating voltage applied to said generator, a reactance element, means for exponentially varying the charge on said reactance element, means for applying a varying voltage to said generator and for controlling the amplitude of said voltage by the charge on said reactance, a detector responsive to radiation penetrating said specimen, and means controlled by said detector for substantially discontinuing the application of voltage to said generator when the specimen penetrating radiation reaches a predetermined value.

4. A measuring system according to claim 3 wherein said reactance element comprises a condenser and said means for exponentially varying the charge thereof comprising a resistance and a source of voltage charging said condenser through said resistance.

5. A measuring system comprising a voltage actuated radiation generator the output of which is dependent upon the voltage applied thereto, means for supporting a specimen a characteristic of which is to be measured by the penetration thereof by the output of the generator, a meter for measuring the peak actuating voltage applied to said generator, an electrical circuit including a source of voltage for actuating said generator, a variable impedance element in said electrical circuit, a condenser for controlling the conductivity of said variable impedance element so as to accordingly control the voltage on said generator, means for exponentially charging said condenser, the conductivity of said variable impedance element being directly proportional to the charge on said condenser whereby the voltage applied to said generator rises substantially exponentially together with the rise in charge of said condenser, a detector responsive to radiation penetrating said specimen, and means controlled by said detector for discharging said condenser and interrupting the application of voltage to said generator when the specimen penetrating radiation reaches a predetermined value.

6. A measuring system according to claim 5 and wherein said last named means comprises a switch across said condenser, said switch being normally open, and a trigger controlled by said detector for closing said switch when the trigger is fired, firing of said trigger being effected by a voltage of predetermined value from said detector.

7. A measuring system according to claim 6 and wherein said variable impedance element is an electronic tube including a control grid, and means for varying the bias voltage on said control grid in accordance with the charge on said condenser.

8. A measuring system according to claim 7 and wherein said means for varying the bias voltage on said control grid is a second electronic tube having plate, control grid and cathode electrodes, said condenser being effectively connected between said control grid and cathode electrodes for supplying a bias voltage to said control grid when the condenser is charged, said plate electrode being connected to said control grid of said first mentioned electronic tube, a plate resistance connected to said plate electrode and whereby the voltage drop across said plate resistance is applied to the control grid of said first mentioned electronic tube.

9. A measuring system comprising a voltage actuated radiation generator the output of which varies as a function of the voltage applied thereto, means for supporting a specimen a characteristic of which is to be measured by the penetration thereof by the output of the generator, a meter for measuring the peak actuating voltage applied to said generator, condenser means for applying a gradually increasing voltage to said generator as said condenser means is charged, means for charging said condenser means, a detector responsive to radiation penetrating said specimen, an amplifier connected to said detector for amplifying the output thereof, a trigger controlled by said amplifier, a switch for discharging said condenser, said trigger being connected to said switch so as to actuate the same and discharge said condenser when the specimen penetrating radiation reaches a predetermined value, discharge of said condenser interrupting the application of increasing voltage to said generator.

10. A measuring system comprising a voltage actuated radiation generator the output of which varies as a function of the voltage applied thereto, means for supporting a specimen a characteristic of which is to be measured by the penetration thereof by the output of the generator, a meter for measuring the peak actuating voltage applied to said generator, means for applying a continuously varying voltage, the variation being in one direction, to said generator, said last named means comprising a high frequency generator and a transformer including a primary winding and a stepped-up secondary winding, said secondary winding being connected to said radiation generator, a variable impedance element in the circuit of said primary winding, a condenser for controlling the conductivity of said variable impedance element so as to accordingly control the voltage through said primary winding circuit and so as to accordingly control the voltage on said radiation generator, means for charging said condenser, means for controlling the conductivity of said variable impedance element by the charge on said condenser so that its conductivity is proportional to the condenser charge whereby the voltage applied to said radiation generator rises together with the rise in charge of said condenser, a detector responsive to radiation penetrating said specimen, and means controlled by said detector for discharging said condenser and thereby so decreasing the conductivity of said variable impedance element as to interrupt the application of voltage to said radiation generator, said last named means being adapted to operate when the specimen penetrating radiation reaches a predetermined value.

11. A method of measuring a specimen's thickness characteristic or the like which comprises gradually varying the power source voltage for a radiation generator substantially in one direction so as to produce a varying quantity of radiation therefrom, directing said radiation through said specimen until the penetrating radiation reaches a predetermined value, and measuring the voltage of said power source when said penetrating radiation has reached said value.

12. A method of measuring a specimen's thickness characteristic or the like which comprises gradually increasing the power source voltage for a voltage actuated radiation generator so as to produce a correspondingly increasing quantity of radiation generated thereby, directing said generated radiation through said specimen until the penetrating radiation reaches a predetermined value, and interrupting the voltage to said radiation generator when said penetrating radiation has reached said value.

13. A method of measuring a specimen's thickness characteristic or the like which comprises gradually increasing the power source voltage for a voltage actuated radiation generator so as to produce a correspondingly increasing quantity of radiation generated thereby, directing said generated radiation through said specimen until the penetrating radiation reaches a predetermined value, interrupting the voltage to said radiation generator when said penetrating radiation has reached said value, and measuring the voltage of said power source when said penetrating radiation has reached said value.

14. A method of measuring a specimen's thickness characteristic or the like which comprises gradually increasing the power source voltage for a radiation generator so as to produce a correspondingly gradually increasing quantity of radiation generated thereby, directing said radiation through said specimen until the penetrating radiation reaches a predetermined value, cutting off the power source voltage for said radiation generator when the penetrating radiation reaches said value, and measuring the highest voltage of said power source reached during said gradual increase.

15. A measuring system comprising a voltage actuated radiation generator the output of which varies as a function of the voltage applied thereto, means for supporting a specimen a characteristic of which is to be measured by the penetration thereof by the output of the generator, a meter for measuring the peak actuating voltage applied to said generator, condenser means for applying a gradually increasing voltage to said generator as said condenser means is charged, means for charging said condenser means, a detector responsive to radiation penetrating said specimen, an amplifier connected to said detector for amplifying the output thereof, a trigger controlled by said amplifier, a switch for discharging said condenser, said trigger being connected to said switch so as to actuate the same and discharge said condenser when the specimen penetrating radiation reaches a predetermined value, discharge of said condenser interrupting the application of increasing voltage to said generator, said switch comprising an electronic tube having plate, control grid and cathode electrodes, the plate and cathode electrodes being respectively disposed on both sides of said condenser whereby said condenser may discharge through said electronic tube depending upon the conductivity thereof, said trigger being connected to said control grid for either rendering said electronic tube conductive or non-conductive.

16. A measuring system according to claim 15 and wherein the output of said trigger is of square wave form, the rising edge of each square wave effecting discharge of said condenser.

CARL A. VOSSBERG, Jr.

REFERENCES CITED

The following references are of record in the file of this patent:

UNITED STATES PATENTS

| Number | Name | Date |
| --- | --- | --- |
| 2,244,137 | Bischoff et al. | June 3, 1941 |
| 2,486,866 | Morgan et al. | Nov. 1, 1949 |
| 2,504,865 | Morgan et al. | Apr. 18, 1950 |
| 2,545,247 | Vingerhoets | Mar. 13, 1951 |